United States Patent [19]

O'Neill

[11] Patent Number: 5,852,283

[45] Date of Patent: Dec. 22, 1998

[54] ELECTRICAL HEATING ELEMENTS AND CONTROLS THEREFOR

[75] Inventor: Robert Andrew O'Neill, Buxton, England

[73] Assignee: Ottes Controls Limited, Derbyshire, England

[21] Appl. No.: 632,507

[22] PCT Filed: Oct. 21, 1994

[86] PCT No.: PCT/GB94/02324

§ 371 Date: Jul. 3, 1996

§ 102(e) Date: Jul. 3, 1996

[87] PCT Pub. No.: WO95/11516

PCT Pub. Date: Apr. 27, 1995

[30] Foreign Application Priority Data

Oct. 21, 1993 [GB] United Kingdom .................... 9321681
Jan. 27, 1994 [GB] United Kingdom .................... 9401559

[51] Int. Cl.$^6$ ............................. H05B 3/68; H01H 37/02; H02H 5/04
[52] U.S. Cl. ......................... 219/449; 337/299; 361/105
[58] Field of Search .................................. 219/438, 441, 219/443, 449, 450, 451, 452, 457, 464, 468, 543; 337/298, 299, 333–336; 361/25, 26, 103, 105

[56] References Cited

U.S. PATENT DOCUMENTS

| | | | |
|---|---|---|---|
| 3,737,624 | 6/1973 | Eilenberger | 219/464 |
| 4,057,707 | 11/1977 | Allen | 219/468 |
| 4,155,291 | 5/1979 | Ryckman, Jr. et al. | 219/441 |
| 4,286,377 | 9/1981 | Hurko et al. | 219/468 |
| 4,431,907 | 2/1984 | Barnett | 219/449 |
| 4,555,686 | 11/1985 | Pejouhy et al. | |
| 4,751,368 | 6/1988 | Daifotes | 219/452 |
| 4,772,777 | 9/1988 | Weller et al. | 219/449 |
| 4,829,280 | 5/1989 | Blackburn et al. | 337/299 |
| 4,843,218 | 6/1989 | Husslein et al. | 219/468 |

FOREIGN PATENT DOCUMENTS

| | | | |
|---|---|---|---|
| 0202939 | 11/1985 | European Pat. Off. | H01H 37/54 |
| 0255347 | 2/1988 | European Pat. Off. | H01H 37/54 |
| 4108725 | 9/1992 | Germany | H01H 37/52 |
| 2211353 | 6/1989 | United Kingdom | H01H 37/00 |

*Primary Examiner*—Teresa J. Walberg
*Assistant Examiner*—Sam Paik
*Attorney, Agent, or Firm*—D. Peter Hochberg

[57] ABSTRACT

A planar heating element for an electrically-heated water boiling vessel comprises a stainless steel plate having a printed heating element formed on one side thereof, the printed heating element being sandwiched between electrically-insulating layers of glass. A control for switching off the element in an overtemperature situation has a primary actuator in the form of a bimetal which directly accesses the printing element through a window formed in the outermost glass insulating layer, and the bimetal is held in a secondary actuator in the form of a thermally-collapsible carrier for the bimetal which contacts the glass insulation around the window. By virtue of this arrangement the primary and secondary actuators are subjected to different temperatures which ensures that the secondary actuator is not susceptible to nuisance operation.

19 Claims, 2 Drawing Sheets

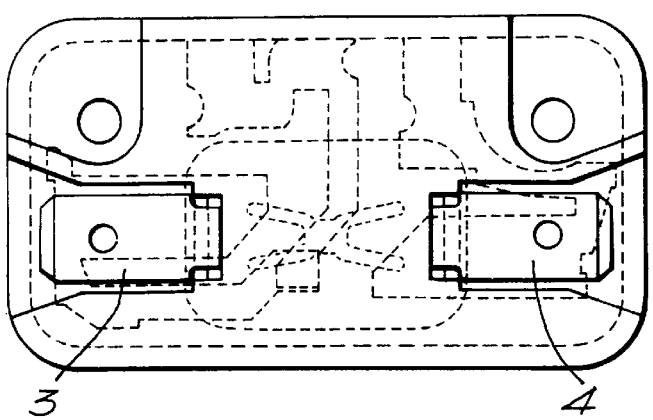
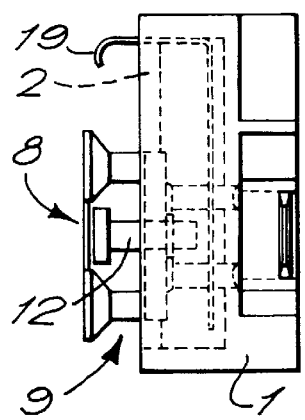
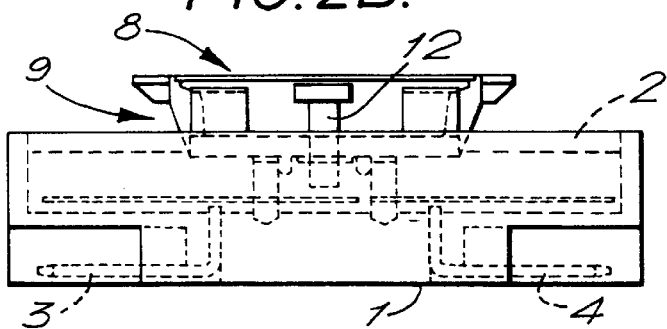
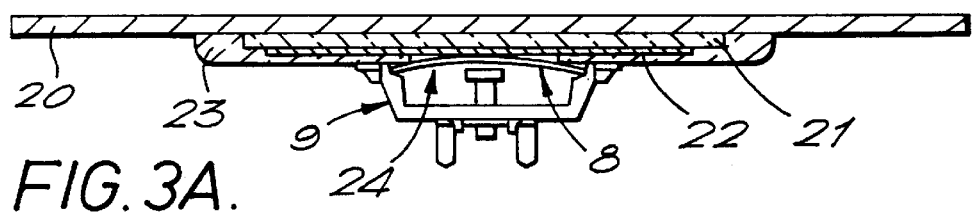
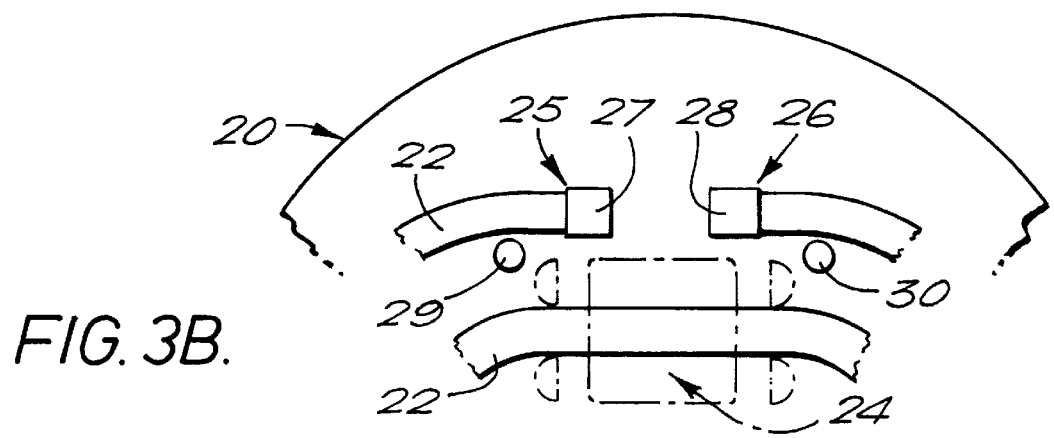

ELECTRICAL HEATING ELEMENTS AND CONTROLS THEREFOR

FIELD OF THE INVENTION

This invention relates to electrical heating elements and controls therefor and more particularly, though not exclusively, concerns electrical heating elements for liquid heating vessels such as electric kettles and hot water jugs and associated controls adapted to switch off the supply of electrical energy to the heating element in response to a sensed element overtemperature condition resulting, for example, from the element being switched on when the associated vessel is empty. Whilst the present invention has particular application to electric kettles and hot water jugs and will be described in the following with particular reference to such application, it is however not limited to such application.

BACKGROUND OF THE INVENTION

The conventional electrical heating element most commonly used in electric kettles, hot water jugs and the like comprises a wire-wound resistance heating element contained within a tubular metal sheath with a mineral insulating material packed around the resistance heating element within the sheath. Sheathed heating elements of this kind are often used as immersion heaters and comprise a heating element proper and an element head portion whereby the element is adapted to be fitted in an aperture formed for the purpose in a vessel wall. The heating element proper commonly has a so-called hot return portion where the element is looped back into contact with the element head portion so as to define a location on the other (dry) side of the element head portion whereat the temperature of the heating element proper can be sensed. Element protector controls are well known which are adapted to be fitted on the dry side of the element head with a thermally-responsive actuator, commonly a bimetallic element, in close heat transfer relationship with the aforementioned location. When the heating element proper overheats, as a result for example of the heating element being switched on without the associated vessel containing any water, a thermal signal is transmitted through the element head to the element protector control to cause the control to switch off the element.

An exemplary element protector control of the above-mentioned kind is the X1 control manufactured by Otter Controls Limited and substantially as described in GB-A-2194099 with particular reference to FIGS. 3A, 3B and 3C thereof. The X1 control provides a primary level of element protection by virtue of incorporating a bimetallic actuator as aforesaid, and furthermore provides a secondary or back-up level of protection, effective in the event however unlikely of failure of the primary protection, by virtue of the bimetallic actuator being mounted in a synthetic plastics carrier which is arranged to deform in the event of the temperature of the element head portion continuing to rise above the temperature at which the primary level of protection would normally operate, the deformation of the carrier thus caused being arranged to effect a switching off of the heating element.

Planar electric heating elements are also known. Coffee making machines commonly include a hot plate for keeping the coffee hot after it has been made, and such a hot plate commonly comprises a sheathed heating element as aforesaid cast or clenched into an aluminium casting which may itself form the hot plate or alternatively may be secured to a stainless steel hot plate. Another form of planar heating element is described in our British Patent Application No. 9321681.0 and generally comprises a patterned resistance heating element formed on an electrically insulating substrate for example by use of lithographic techniques using electrically-conductive ink or photolithographic techniques as are well known in the field of semiconductor device fabrication, and/or by other deposition techniques such as flame spraying of metals, plasma vapour deposition etc. which per se are well known. More particularly the planar heating element that is described in our British Patent Application No. 9321681.0 comprises a thin sheet of stainless steel, which forms the upper surface of the element, on the underside of which there is provided a thin layer of glass or other temperature-resistant electrically-insulating material. A resistance heating element proper is formed on the surface of the glass layer, for example by printing using an electrically conductive ink, and a further thin layer of glass or other temperature-resistant electrically-insulating material is provided over the printed element.

The present invention particularly, though not exclusively, concerns a planar heating element generally of the kind that is described in our British Patent Application No. 9321681.0 as outlined above and an element protection control adapted for use with such an element. The present invention results from further work that we have done to develop the planar heating element aforementioned and to modify the aforementioned X1 control so. as to adapt it to use with such a planar element.

SUMMARY OF THE INVENTION

According to the present invention in one of its aspects there is provided a generally planar electrical heating element which is designed for use with an element protector control having a primary thermally-responsive actuator and a secondary thermally-responsive actuator operable in response to the element temperature rising significantly above the temperature at which the primary actuator is designed to operate, said electrical heating element comprising a substrate or base plate, an electrically-insulating layer formed on a portion at least of one surface of said substrate or base plate, an electrical conductor formed on said electrically-insulating layer so as to be isolated thereby from said substrate or base plate, said electrical conductor being formed of a material having such an electrical resistance as to constitute an electrical resistance heating element proper, and a further electrically-insulating layer formed over said electrical conductor, said further electrically-insulating layer having an opening therethrough whereat, in use of the electrical heating element with the element protector control aforesaid, the primary thermally-responsive actuator may access the said electrical conductor so as to be responsive directly to the temperature thereof, the secondary thermally-responsive actuator being prevented from accessing the said electrical conductor directly and being responsive to the temperature thereof by conduction of heat through the further electrically-insulating layer.

In an exemplary embodiment of the above aspect of the present invention which is adapted for use with a modified form of the aforementioned X1 element protector control, the bimetallic primary thermally-responsive actuator of the control is arranged to be responsive directly to the temperature of the heating element by virtue of being located so as to register with the opening in the further insulating layer, and the feet of a plastics material carrier which constitutes the secondary thermally-responsive actuator of the control and serves as a mounting for the bimetallic primary thermally-responsive actuator are arranged to contact the further insulating layer outside of the said opening therein. As described in detail hereinafter, the said embodiment has a stainless steel substrate or base plate, the two electrically-insulating layers are formed of a glass material and the electrical resistance heating element proper comprises a heater track formed of a conductive ink. The heater track has end terminations which are accessible through respective openings formed in the second electrically-insulating (eg., glass) layer and the element protector control has spring metal conductors adapted to make contact with the said end terminations when the control is put into operative positional relationship with the heating element. The use of a stainless steel substrate or base plate is advantageous for heating elements which are to be used in plastics bodied vessels since the relatively poor thermal conductivity of stainless steel can be employed to thermally isolate the plastics vessel body from the resistance heating element proper. However the use of a stainless steel substrate is exemplary only and other materials could be used. The substrate or base layer could even be one and the same as the first-mentioned electrically-insulating layer, in which case the electrical resistance heating element proper might be formed directly on the substrate.

The invention also extends to the combination of a heating element as aforesaid with an element protector control as aforesaid, and to a liquid heating vessel incorporating such a combination. In yet a further aspect, the present invention provides furthermore an element protector control for use with a generally planar heating element, the said control comprising a body part formed of electrically insulating material, a primary thermally-responsive switch actuator provided on one side of said body part to be juxtaposed with a generally planar heating element, a secondary thermally-responsive switch actuator provided on said one side of said body part to be juxtaposed with said generally planar heating element at one or more locations spaced apart from the location whereat said primary thermally-responsive switch actuator is arranged to be juxtaposed with the generally planar heating element, switch means in said body part responsive to said primary and secondary thermally-responsive switch actuator for determining the supply of electrical energy through the control to the generally planar heating element, and terminal means electrically connected to said switch means and extending on said one side of said body part for electrically contacting electrical terminals of said generally planar heating element.

The foregoing and other aspects and features of the present invention are set forth with particularity in the appended claims and, together with the advantages thereof, will best be understood from consideration of the following detailed description, given with reference to the accompanying drawings, of an exemplary embodiment of the invention.

BRIEF DESCRIPTION OF THE DRAWINGS

FIGS. 2A, 2B and 2C are, respectively, top plan, side elevation and end elevation views of the element protector of FIG. 1; and FIGS. 3A and 3B are schematic sectional side elevation and top plan views of a planar heating element embodying another aspect of the present invention, the control of FIGS. 1 and 2 being adapted for use with a planar heating element such as that of FIGS. 3.

DETAILED DESCRIPTION OF THE EMBODIMENTS

Figure 1:
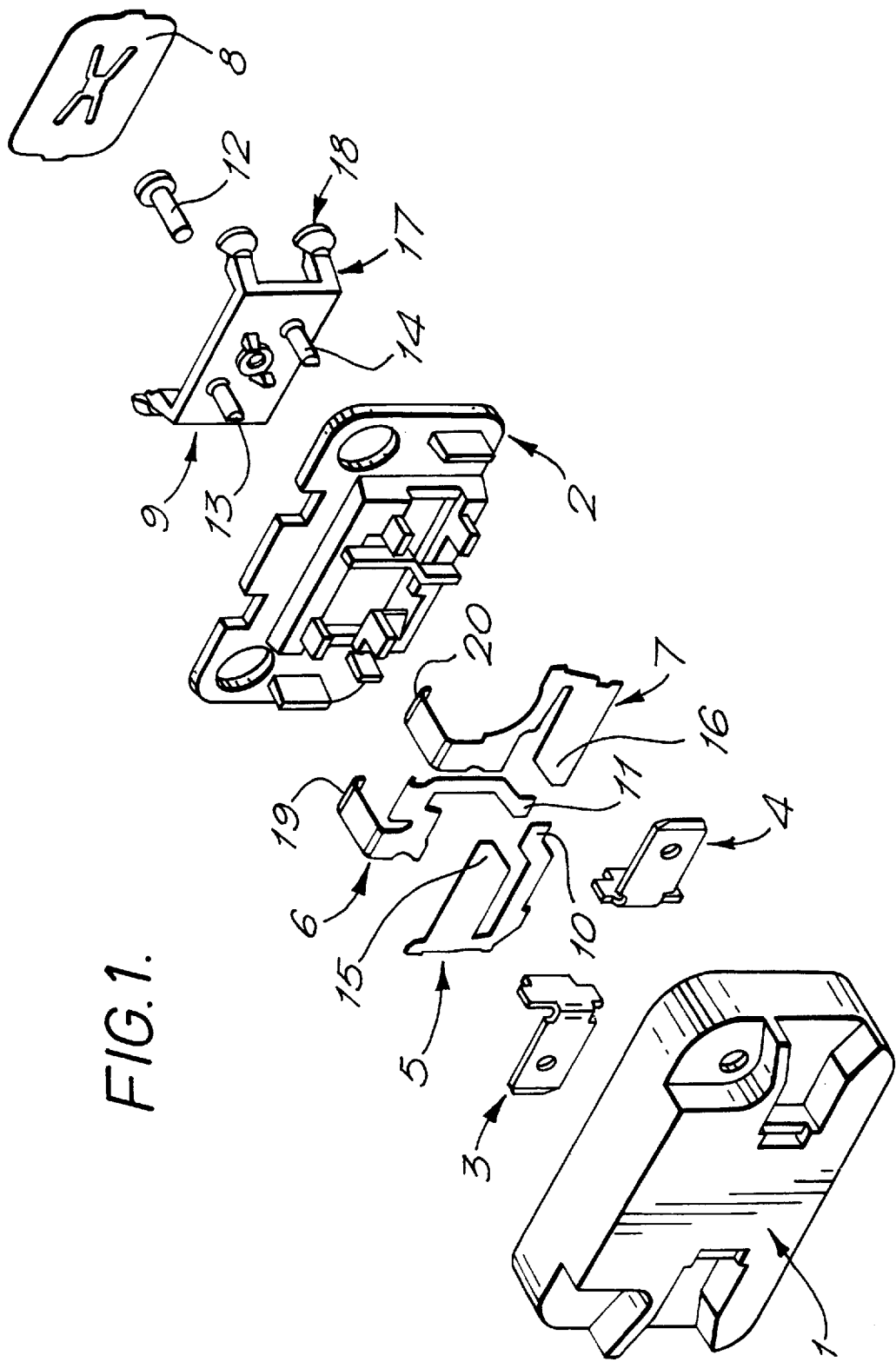
FIG. 1 shows an exploded perspective view of an element protector control embodying one aspect of the present invention.

Before embarking upon a detailed description of the embodiments, it is to be understood that the element protector control of FIGS. 1 and 2 is a modified form of the X1 control aforementioned which is described in GB-A-2194099 with particular reference to FIGS. 3A, 3B and 3C thereof. Reference should be had to GB-A-2194099 for a full understanding of all aspects and advantages of the subject control which will be described only briefly in the following.

Referring first to FIG. 1, the element protector control illustrated therein comprises first and second moulded plastics body parts 1 and 2 which are adapted to fit together and to capture therebetween first and second terminals 3 and 4 and spring metal conductors 5, 6 and 7. On the other side of body part 2 there is provided a bimetallic primary switch actuator 8 which, in similar manner to the X1 control described in GB-A-2194099, is adapted to be mounted in a plastics material carrier 9 which is adapted in turn to locate in predetermined manner with the front (not visible) face of body part 2.

The bimetallic primary switch actuator 8 is arranged, in a manner substantially identical to that described in GB-A-2194099, to determine the status of a switch defined by the parts 10 and 11 of the spring metal conductors 5 and 6, a push-rod 12 being provided for this purpose. The parts 10 and 11 normally make electrical contact with each other and are opened by push-rod 12 when the bimetallic primary switch-actuator 8 responds, in use, to an element overtemperature condition. In the event that the primary switch actuator fails, for whatever reason, to open the contact between the parts 10 and 11, the heating element will continue to be powered so that its temperature will rise to a level whereat the secondary thermally-responsive actuator constituted by the plastics material carrier 9 will become operative. The carrier 9 has rearwardly-facing projections 13 and 14 which are designed to extend through the body part 2 and into contact with the parts 15 and 16 of the spring metal conductors 5 and 7 so that, when the control is operatively coupled to a planar heating element and the carrier 9 is urged rearwardly towards the body part 2, the spring metal parts 15 and 16 are urged by the projections 13 and 14 into contact with the terminals 3 and 4 respectively. The carrier 9 has four legs 17 with feet 18 which sit upon the rear surface of an associated heating element and, when the element temperature rises to such a level as to cause the legs 17 to begin to melt, the carrier 9 is collapsed in a forwards direction towards the heating element by the spring action of the conductor parts 15 and 16 so that the conductor parts 15 and 16 eventually move out of contact with the terminals 3 and 4 of the control.

The element protector control of FIGS. 1 and 2 is adapted for use with a generally planar heating element and it will be seen that the spring metal conductors 6 and 7 have forwardly extending portions 19 and 20 which are adapted to project forwardly of the control body part 2 and make electrical contact with terminal portions of the planar heating element for supplying electrical energy thereto through the control.

Referring now to FIGS. 3A and 3B, these show sectional side elevation and schematic plan views respectively of an exemplary form of planar heating element in accordance with one aspect of the present invention. The planar heating element comprises a stainless steel substrate or base plate 20 having an electrically-insulating first layer 21 of glass formed thereon in a central area thereof, a heater track 22 formed of electrically conductive ink formed on the glass layer 21, and an electrically-insulating second glass layer 23 formed over the heater track 22 and over the first glass layer 21. An opening or window 24 is provided in the second glass layer 23 so as to expose the heater track 22 beneath the opening and, as shown in FIG. 3B, the opening 24 is sized to enable the bimetallic primary actuator 8 of the control of FIG. 1 to be directly responsive to the temperature of the heater track 22, but to locate the feet 18 of the carrier 9 on the glass surface outside of and surrounding the opening. Additional openings 25 and 26 are provided in the second glass layer 23 at locations corresponding to terminal ends 27 and 28 of the heater track 22 and are arranged to be contacted by the forwardly projecting parts 19 and 20 of the control spring conductors 6 and 7 when the control is fitted in operative relationship with the heating element. The terminal ends 27 and 28 of the heater track 22 are preferably formed of silver or of a likewise good electrical contact material.

Mounting pillars 29 and 30 are provided on the heating element base plate 20 for enabling the attachment of the element protector control thereto. Such mounting pillars may be screw threaded or may be designed to be engaged by any suitable form of friction securing means.

In operation of the thus-described planar heating element with the thus-described element protector control, the fact that the bimetallic primary actuator of the control is in direct heat transfer relationship with the heater track of the element ensures a rapid response of the control to an element overtemperature situation. At the same time, by insulating the secondary protection means, namely the collapsible carrier 9, from the heater track 22, it is ensured that the thermal overshoot which normally accompanies the primary operation of the control, that is to say the dynamic temperature rise that normally occurs in the element after operation of the primary protection, will not result in actuation of the secondary protection. The close thermal contact of the bimetallic primary actuator with the heater track furthermore enables improved primary protection response times to be achieved which additionally reduces the temperature overshoot level. These factors facilitate the selection of appropriate materials for the carrier 9.

The relatively "flat" shape of the element protector control is furthermore aesthetically advantageous and simplifies the task of incorporating the control into an aesthetically pleasing appliance design.

There has thus been described in the foregoing an arrangement of a bimetal control with a deforming backup protection, mounted to a printed element, in which the bimetal of the control makes direct thermal contact with the heater track and the deformable backup protection is thermally insulated from the track by an outer layer of glass which limits the overshoot temperature to which it is exposed, so that practical thermoplastics may be used in its construction. In addition, in this arrangement, a construction is described in which electrical connection to the heater track is made by direct contact between springs, which are integral with the control, and printed contact points electrically connected to the heater track.

The invention having thus been described with reference to exemplary embodiments, it is to be clearly understood that the described embodiments illustrate and exemplify the invention and do not limit the same, and that modifications and variations will occur to those possessed of relevant skills without departure from the scope of the invention as indicated by the appended claims. For example, an enclosure may be provided on the opposite (wet) side of the planar element at a location corresponding to the location of the opening 24 whereat the bimetal 8 senses the element temperature, the enclosure having apertured walls permitting the ingress of water into the enclosure when the vessel is filled, but of such a size and arrangement that when water boils in the vessel the generation of steam in the enclosure expels the water therefrom. By virtue of the provision of such an enclosure, a single control serves both as an element overtemperature control operating to switch off the element if, for whatever reason, it overheats, and also to switch off the element automatically when water boils in the vessel, the boiling of the water in the vessel and the expulsion of water from the enclosure causing an element overtemperature condition within the enclosure which causes the control to operate.

I claim:

1. A generally planar electrical heating element which is designed for use with an element protector control having a primary thermally-responsive actuator and a secondary thermally-responsive actuator operable in response to the element temperature rising significantly above the temperature at which the primary actuator is designed to operate, said electrical heating element comprising a substrate defining an electrically-insulating surface, an electrical conductor formed on said electrically-insulating surface, said electrical conductor being formed of a material having such an electrical resistance as to constitute an electrical resistance heating element proper, and an electrically-insulating layer form said electrical conductor, said electrically-insulating layer having an opening therethrough whereat, in use of the electrical heating element with the element protector control aforesaid, the primary thermally-responsive actuator may access the said electrical conductor so as to be responsive directly to the temperature thereof, the secondary thermally-responsive actuator being prevented from accessing the said electrical conductor directly and being responsive to the temperature thereof by conduction of heat through the electrically-insulating layer.

2. A heating element as claimed in claim 1 wherein said substrate is formed of a metallic material.

3. A heating element as claimed in claim 2 wherein said metallic material comprises stainless steel.

4. A heating element as claimed in claim 2 wherein said second electrically-insulating layer is formed of a glass material.

5. A heating element as claimed in claim 1 wherein said substrate is formed of a non-metallic electrically-insulating material.

6. A heating element as claimed in claim 5 wherein the substrate is formed of the same material as the first-mentioned electrically-insulating layer formed thereon.

7. A heating element as claimed in claim 6 wherein the substrate and the first-mentioned electrically-insulating layer formed thereon are one and the same.

8. A heating element as claimed in claim 1 wherein the first-mentioned electrically-insulating layer is formed of a glass material.

9. A heating element as claimed in claim 1 wherein said electrical conductor comprises an electrically-resistive heater track deposited onto the electrically-insulating layer.

10. A heating element as claimed in claim 9 wherein said heater track comprises electrically conductive ink printed onto the electrically insulating layer.

11. A heating element as claimed in claim 9 wherein said heater track includes end terminations underlying respective apertures provided in overlying electrically-insulating layer for enabling said end terminations to be accessed for supplying electrical energy to the heater track.

12. A heating element as claimed in claim 1 in combination with an element protector control.

13. A combination as claimed in claim 1 wherein the primary thermally-responsive actuator comprises a bimetallic element and the secondary thermally-responsive actuator comprises a member formed of a material selected to be deformable under spring pressure at temperatures above a predetermined level.

14. A combination as claimed in claim 13 wherein the secondary thermally-responsive actuator comprises a member formed of a thermoplastics material.

15. A combination as claimed in claim 13 wherein the secondary thermally-responsive actuator comprises a carrier for said bimetallic element.

16. A heating element as claimed in claim 1 wherein said substrate has an electrically-insulating layer formed on a portion of at least one surface of said substrate, said electrical conductor is formed on said electrically-insulating layer so as to be isolated thereby from said substrate, and said heating element further comprising a second electrically-insulating layer, said electrically-insulating layer forming said opening.

17. An element protector control for use with a generally planar heating element, the said control comprising a body part formed of electrically insulating material, a primary thermally-responsive switch actuator provided on one side of said body part to be juxtaposed with a generally planar heating element, a second thermally-responsive switch actuator provided on said one side of said body part to be juxtaposed with said generally planar heating element at least one location spaced apart from the location whereat said primary thermally-responsive switch actuator is arranged to be juxtaposed with the generally planar heating element, switch means in said body part responsive to said primary and second thermally-responsive switch actuators for determining the supply of electrical energy through the control to the generally planar heating element, and terminal means electrically connected to said switch means and extending on said one side of said body part for electrically contacting electrical terminals of said generally planar heating element.

18. A planar heating element comprising a heater track formed on a substrate and an electrically-insulating layer formed over said heater track, said layer having an aperture therein in registry with a portion of the heater track, said aperture providing access to the heater track for directly monitoring the temperature thereof.

19. A planar heating element as claimed in claim 18 in combination with an element protector control, said control including a primary thermally-responsive actuator arranged to be responsive directly to the temperature of that portion of the heater track which is accessible through said aperture and a secondary thermally-responsive actuator arranged to be responsive to the temperature of the heater track at one or more locations outside of said aperture.

* * * * *